United States Patent [19]

Fajeau

[11] Patent Number: 4,567,761
[45] Date of Patent: Feb. 4, 1986

[54] DEVICE FOR DETECTING VARIATIONS IN THE HEIGHT OF THE FREE LEVEL OF A LIQUID

[75] Inventor: Maurice Fajeau, Pertuis, France

[73] Assignee: Commissariat a l'Energie Atomique, Paris, France

[21] Appl. No.: 410,832

[22] Filed: Aug. 23, 1982

[30] Foreign Application Priority Data

Sep. 4, 1981 [FR] France .................. 81 16848

[51] Int. Cl.[4] .................. G01F 23/00
[52] U.S. Cl. .................. 73/290 R; 73/299; 376/247; 376/258
[58] Field of Search .......... 376/247, 258; 73/290 R, 73/293, 299, 302

[56] References Cited

U.S. PATENT DOCUMENTS

| | | | |
|---|---|---|---|
| 3,164,991 | 1/1965 | Potthoff et al. | 73/299 |
| 3,221,551 | 12/1965 | Hoggin et al. | 73/299 |
| 3,371,534 | 3/1968 | Akeley | 73/299 |
| 3,476,538 | 11/1969 | Trethewey | 73/302 |
| 3,537,298 | 11/1970 | Kapff | 73/299 |
| 3,538,746 | 11/1970 | Jacobs et al. | 73/299 |
| 4,393,705 | 7/1983 | Eidschun | 73/439 |
| 4,394,346 | 7/1983 | Morooka | 73/299 |
| 4,450,722 | 5/1984 | Keyes et al. | 73/293 |

FOREIGN PATENT DOCUMENTS 1413444 8/1965 France .
1481242 5/1967 France .

Primary Examiner—Salvatore Cangialosi

[57] ABSTRACT

The present invention relates to a device making it possible to detect variations in the height of the free level of a liquid in an enclosure.

The device comprises a vertical short tube issuing into the upper part of the vessel and whose upper end issues into a first condensation pot, a long tube whose long end issues into the vessel at a level below that at the end of the short tube, the end of the long tube being provided with a hydraulic seal, while the upper end of the long tube issues into a second condensation pot, a differential manometer indicating any pressure differences between the two condensation pots.

Application to the measurement of the level of the water contained in the vessel of a pressurized water nuclear reactor.

3 Claims, 2 Drawing Figures

DEVICE FOR DETECTING VARIATIONS IN THE HEIGHT OF THE FREE LEVEL OF A LIQUID

BACKGROUND OF THE INVENTION

The present invention relates to a device for detecting and measuring variations in the height of a free level of a liquid and more particularly a liquid contained in a field pressurized enclosure, e.g. the vessel of a pressurized water nuclear reactor.

At present there are various methods which make it possible to measure the height of the free level of a liquid contained in a pressurized enclosure. A first method uses a level indicator in the form of a differential manometer, whose connecting tubes are horizontal and positioned at different heights. The main disadvantage of this device is that the upper connecting tube is continuously filled with a mixture of the liquid and its vapour, due to the partial boiling in the connecting tube, even when the level in the enclosure drops, which leads to measuring errors. A second method consists of positioning in the vicinity of the wall of the enclosure and outside the latter, a certain number of radioactive sources located at different heights and a certain number of detectors, which are generally diametrically opposite to the said sources. The comparison of the readings given by the different detectors makes it possible to determine the height of the free surface of the liquid. The latter solution requires complex equipment and therefore significantly increases the cost of such installations.

BRIEF SUMMARY OF THE INVENTION

The present invention relates to a device, which obviates the aforementioned disadvantages, whilst being simple to instal and having maximum operational reliability.

According to the main feature of the device according to the invention the liquid is contained in a pressurized field enclosure. The device comprises:

a first vertically positioned tube or "short tube", whose lower end issues into the enclosure in the vicinity of its upper wall and whose upper end issues to the exterior of the enclosure into a first container or "condensation pot";

a second tube or "long tube" having a lower end issuing into the enclosure at a level below that of the short tube and which is provided with a hydraulic seal in order that the long tube remains constandtly filled with liquid when the level thereof in the enclosure drops below the lower end of the long tube, and having an upper end issuing into a second container or condensation pot, the long tube and the second condensation pot consequently being constantly filled with liquid;

and a differential manometer making it possible to measure the pressure difference between the first and second condensation pots.

According to a first variant of this device, the long and short tubes are remote from one another, the two condensation pots having similar dimensions and are located substantially in the same horizontal plane.

According to another variant, the long tube is positioned within the short tube and the first condensation pot, the second condensation pot being positioned abover the latter.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
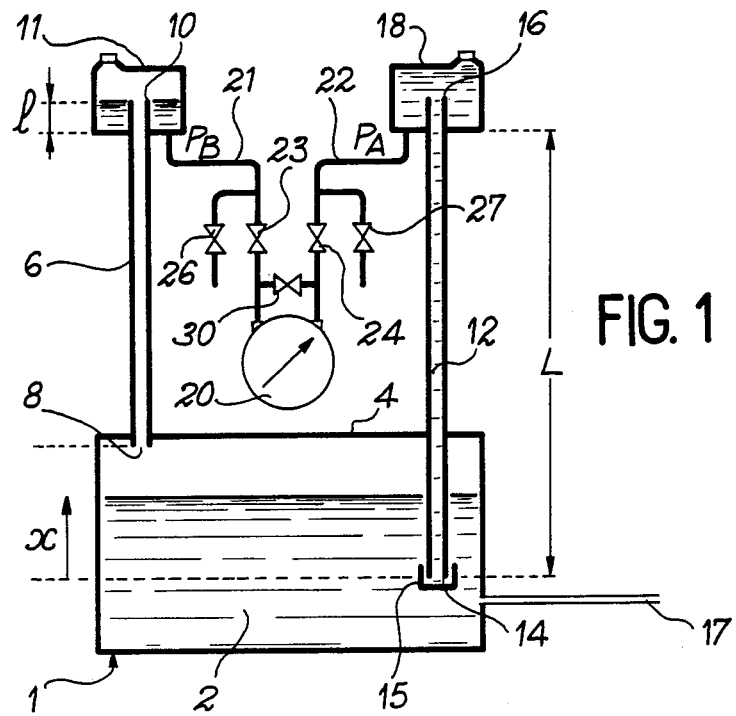
FIG. 1 a diagrammatic view showing a first variant of the device in which the short and long tubes are remote from one another.

FIG. 1 shows an enclosure 1 partly filled with a liquid 2 and whose upper part is sealed by an upper wall or cover 4. A first tube or "short tube" 6 having a large diameter is positioned vertically above enclosure 1 and the lower end 8 of tube 6 issues into the upper part of the vessel in the vicinity of cover 4. The upper end 10 of short tube 6 issues into a first enclosure or "condensation pot" 11, at a height 1 above the bottom thereof. A second tube or "long tube" 12, which is vertical in the present embodiment, passes into vessel 1 and its lower end 14 issues into the latter at a level well below that at which end 8 of short tube 6 enters said vessel. The lower end 14 of tube 12 is provided with a hydraulic or liquid seal 15 which, in the present embodiment is constituted by a bucket. This device enables tube 12 and second container 18 to remain constantly filled with a liquid, even if the free level thereof in vessel 1 drops below bucket 15. The pressure of the gas in enclosure 1 bears on the free surface of the liquid contained in the bucket and therefore prevents the emptying of tube 12. The upper end 16 of tube 12 issues into a second container, or condensation pot 18, which is of essentially the same size as the first condensation pot 11 and is located in the same horizontal plane as the latter. A differential manometer 20 indicates at all times the difference between pressure $P_B$ in the first condensation pot 11 and pressure $P_A$ in the second condensation pot 18. Two pipes 21, 22, provided with isolating valves 23, 24 connect manometer 20 to condensation pots 11, 18 respectively. There are also two valves 26, 27 for draining and cleaning pipes 21, 22, as well as a valve 30 for bypassing manometer 20. Pipes 21, 22 issue into the bottom of containers 11 and 18, where the pressurization points are located. It is of interest in this variant that the bottoms of the condensation pots are in the same horizontal plane because, when vessel 1 and short tube 6 are filled with liquid, we obtain: $P_B - P_A = 0$.

The device operates in the following way. On taking as the reference plane, the horizontal plane corresponding to the lower end 14 of the long tube 12 and on designating by x the height of the free level of the liquid 2 above said reference plane, the pressure difference $P_B - P_A$ is given by the following formula:

$$P_B - P_A = -\rho g x + \rho g (L + l)$$

with $\rho$=density of liquid, g=acceleration of gravity, L=height of long tube between its lower part 14 and the bottom of the second condensation pot 18, l=difference in level between the upper part of the short tube 6 and the bottom of the first condensation pot 11.

Thus, when the level of the free surface of the liquid 2 is between the reference plane and the upper part of the vessel or within the short tube 6, the pressure difference $P_B-P_A$ varies in a linear manner as an inverse function of the height x of the liquid. When the free surface of the liquid in tube 6 reaches the upper end 10 thereof, the pressure difference $P_B-P_A$ is cancelled out because $x=L+l$ and the points where these pressures are taken are located in the same horizontal plane within the same liquid mass.

When the free surface of liquid 2 drops below the lower end 14 of long tube 12 and no matter what the height of the liquid, the pressure difference $P_B-P_A$ is constant and not zero, because the hydraulic seal 15 prevents long tube 12 and the second condensation pot 18 from being emptied.

Initially when vessel 1 and tube 6 are entirely filled with liquid up to a level equal to or above that of the upper end 10 of tube 6, the pressure difference $P_B-P_A$ is zero. In the case of an accidental leak in vessel 1, a free level appears in the upper part thereof and tube 6 immediately empties. The fact that it is vertical facilitates the downward movement of the liquid and prevents it from being blocked by a possible condensation of the vapour of liquid 2. The manometer then detects a sudden increase in the differential pressure $P_B-P_A$ and can, if necessary, initiate a standby supply 17 by means of a servocontrol system. Conversely, during the filling of the vessel, the manometer can act to stop the supply as soon as the difference $P_B-P_A$ is cancelled out again. The hydraulic seal 15 in the lower end 14 of the long tube 12 keeps the latter constantly filled with liquid, when the level thereof in the enclosure drops below the reference plane. As a result there is a constant differential pressure reading (difference $P_B-P_A$ not being zero) whilst the free level of the liquid in the enclosure in below the lower end of the long tube. If the latter were emptied, there would be a zero pressure difference and it would not be possible to tell whether the container was full or partly empty.

Figure 2:
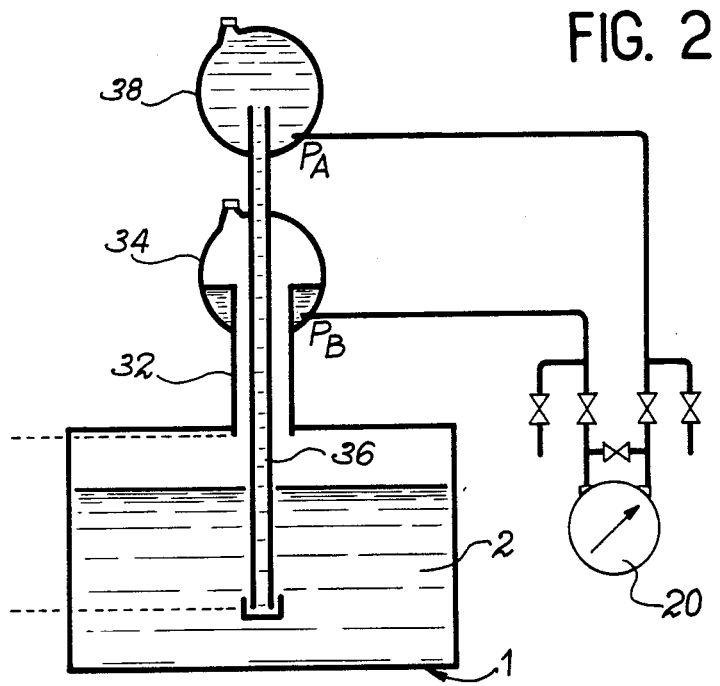
FIG. 2 a diagrammatic view of a second variant in which the long tube is positioned within the short tube and is concentric thereto.

FIG. 2 illustrates a variant in which the short and long tubes are no longer separate as in FIG. 1 and are instead arranged concentrically with respect to one another. In FIG. 2 it is possible to see short tube 32, whose diameter is larger than that of tube 6 of FIG. 1 positioned in the upper part of vessel 1. Short tube 32 issues into a first condensation pot 34. It is also possible to see long tube 36, which issues into the vessel at a level below that of tube 32, but which is positioned within and concentric to the latter. Long tube 36 consequently traverses tube 32, as well as the first condensation pot 34 and its upper end issues into a second condensation pot 38 positioned above the first.

The operating principle of this second variant is the same as that of the variant described with reference to FIG. 1. However, it is pointed out that when the vessel and tube 32 are filled with liquid, the pressure difference $P_B-P_A$ is constant, but is not zero because the pressurizing points are not located in the same horizontal plane of the same liquid mass. However, it is still possible to set off an alarm by setting the manometer to the critical differential pressure value corresponding to the filling of tube 32. In this variant, when the level of the free surface of the liquid 2 in vessel 1 drops below the reference plane, the difference $P_B-P_A$ is still constant, but differs from the differential pressure corresponding to the filling of tube 32. Thus, it is still possible to control the supply to the vessel by taking into account the two critical differential pressure values.

It is clear that the device according to the invention has a number of particularly important advantages. Firstly it has a simple and inexpensive construction and the fact that the short tube 6 is vertical prevents measuring errors due to the possible clogging thereof by condensed steam. In addition, the fact that the long tube is provided with a hydraulic seal enabling it to stay constantly filled with liquid ensures that the pressure difference $P_B-P_A$ is constant and not zero when the liquid level in vessel 2 drops below the reference plane. Therefore it is particularly easy to know whether the vessel is full or whether it is partly emptied. Thus, it is possible to start up or stop an external supply or trigger off an alarm as a result of the manometer reading.

Moreover, the arrangement of a condensation pot vertically with respect to the long tube makes it possible to recondense the steam which forms there during the accidental depressirization of the enclosure, thus preventing density variations in the tube, which could interfere with the pressure measurement.

The invention is obviously not limited to the variants described hereinbefore and numerous further variants can be conceived without passing beyond the scope of the invention. Thus, the fact that short tube 6 is always vertical does not mean that the long tube need also be vertical although, as has been stated hereinbefore, it is the simplest and most advantageous solution. Furthermore the hydraulic seal enabling the latter to be constantly filled with liquid is in the form of a bucket in the two embodiments described, but numerous variants can be considered, e.g. giving it a curved shape at the lower end of the long tube.

What is claimed is:

1. A device for detecting variations in the height of the free level of a liquid contained in a sealed enclosure having an upper wall, said device comprising:
   a first tube which is vertically positioned, said first tube having a lower end issuing into said enclosure in the vicinity of said upper wall and an upper end issuing into a first container disposed above said upper wall,
   a second tube having a lower end issuing into said enclosure at a level below the level at which the lower end of the first tube issues into said enclosure and an upper end issuing into a second container, said second tube and said second container being filled with liquid,
   sealing means disposed at the lower end of the second tube so that the second tube and the second container remain constantly filled with liquid,
   a differential manometer,
   a first pipe connecting said differential manometer to the first container, and
   a second pipe connecting said differential manometer to the second container.

2. A device according to claim 1 wherein the first and second tubes are spaced apart from one another and said first and second pipes are connected with said first and second containers respectively at points which are in the same horizontal plane.

3. A device according to claim 1 wherein at least part of the second tube is positioned within the first tube and within the first container and the second container is positioned above the first container.

* * * * *